United States Patent
Park et al.

(10) Patent No.: US 8,681,869 B2
(45) Date of Patent: Mar. 25, 2014

(54) DISTORTION MEASURING METHOD

(75) Inventors: HyunWook Park, Daejeon (KR); Jeehong Lee, Daejeon (KR)

(73) Assignee: Korea Advanced Institute of Science and Technology (KR)

( * ) Notice: Subject to any disclaimer, the term of this patent is extended or adjusted under 35 U.S.C. 154(b) by 497 days.

(21) Appl. No.: 12/704,255

(22) Filed: Feb. 11, 2010

(65) Prior Publication Data

US 2011/0080484 A1    Apr. 7, 2011

(30) Foreign Application Priority Data

Oct. 6, 2009 (KR) .................. 10-2009-0094696

(51) Int. Cl.
*H04N 7/12* (2006.01)
(52) U.S. Cl.
USPC ...................................... 375/240.16
(58) Field of Classification Search
USPC ...................................... 375/240.16, 240.01
IPC ...................................... H04N 7/12
See application file for complete search history.

(56) References Cited

U.S. PATENT DOCUMENTS 6,064,776 A * 5/2000 Kikuchi et al. ............... 382/260
6,266,371 B1 * 7/2001 Kondo .................... 375/240.16
6,275,532 B1 * 8/2001 Hibi et al. ............... 375/240.17
2009/0141810 A1 * 6/2009 Tabatabai et al. ........ 375/240.25
2010/0086027 A1 * 4/2010 Panchal et al. ........... 375/240.12

OTHER PUBLICATIONS

Yin et al. "Localized Weighted Prediction for Video Coding," 2005, pp. 4365-4368, IEEE, Princeton, NJ.
Hur et al. "Adaptive Local Illumination Change Compensation Method for H.264/AVC-Based Multiview Video Coding," 2007, pp. 1496-1505, 17 (11), IEEE.
Turaga et al. "Estimation and Mode Decision for Spatially Correlated Motion Sequences," 2001, pp. 1098-1108, 11 (10), IEEE.

* cited by examiner

*Primary Examiner* — David Czekaj
*Assistant Examiner* — Tracy Li
(74) *Attorney, Agent, or Firm* — The Belles Group, P.C.

(57) ABSTRACT

A method for measuring distortion is provided. In one embodiment, the method for measuring distortion of a current block, used to estimate motion by estimating high-frequency and low-frequency components of the current block, comprises: calculating the sum of distortion values of the high-frequency component of the current block; calculating the sum of first distortion values of the low-frequency component of the current block; calculating a second distortion value of the low-frequency component of the current block; and adding the sum of the distortion values of the high-frequency component and the second distortion value of the low-frequency component of the current block.

12 Claims, 4 Drawing Sheets

DISTORTION MEASURING METHOD

CROSS-REFERENCE TO RELATED APPLICATION

The present application claims priority under 35 U.S.C. §119 to Korean Patent Application No. 10-2009-0094696, filed Oct. 6, 2009, the entirety of which is hereby incorporated by reference.

BACKGROUND OF THE INVENTION

1. Field of the Invention

The present invention relates to a method for measuring distortion.

2. Description of the Related Art

A method for simultaneously minimizing high-frequency and low-frequency components of a residual signal with respect to a general image is used in a motion estimation method according to related arts. A method for obtaining residual signals between a current block and a reference block obtained by the motion estimation method is used in a motion compensation method. In the motion compensation method, a method for simultaneously minimizing the distortions of the high-frequency and low frequency components of the current block is generally used as a method for measuring distortion. The method may be implemented using Equation 1.

$$SAD = Dist_{Total} = Dist_{AC} + Dist_{DC} = \sum_{i,j}^{N} |C(i, j) - R(i, j)| \quad (1)$$

Here, $C(i, j)$ denotes a pixel value of the current block, and $R(i, j)$ denotes a pixel value of the reference block. Also, $i$ and $j$ denote lateral and longitudinal positions in each of the blocks, respectively, and N denotes a size of each of the blocks. $Dist_{AC}$ and $Dist_{DC}$ denote a sum of distortion values of the high-frequency component and a sum of distortion values of the low-frequency component, respectively. SAD (Sum of Absolute Differences) refers to a method for measuring distortion widely used in existing MPEG-x, H.26x and the like. The residual signals between the blocks are obtained through the SAD to perform video coding.

Next, a method for minimizing the distortion value of the high-frequency component of the current block and the reference block is used as the method for measuring distortion. The method may be implemented using Equation 2. (For reference, see D. S. Turaga and T. Chen, "Estimation and mode decision for spatially correlated motion sequences," IEEE Transactions on Circuits and Systems for Video Technology, Vol. 11, No. 10, pp. 1098-1107, October 2001).

$$MRSAD = Dist_{AC} = \sum_{i,j} |(C(i, j) - m_C) - (R(i, j) - m_R)|. \quad (2)$$

Here, $m_C$ and $m_R$ denote a mean pixel value of the current block and a mean pixel value of the reference block, respectively. MRSAD (Mean-Removed SAD) is used together with a compensation method of DC-components so as to compress images with a large illumination change and multiview images. (For reference, see J.-H. Hur, S. Cho, Y.-L. Lee, "Adaptive Local Illumination Change Compensation Method for H.264/AVC-Based Multiview Video Coding," IEEE Transaction on Circuits and Systems for Video Technology, Vol. 17, No. 11, November 2007).

Next, in the motion estimation method of images with a large illumination change, there has been proposed a technique for selectively applying a method based on the characteristics of images. In the method, in order to prevent an increase of the calculation amount generated in estimating only the high-frequency component of residual signals, an inaccurate high-frequency component of the current block is estimated using the mean value of non-neighboring pixels of the current block and the reference block, and an inaccurate low-frequency component of the current block is estimated using the non-neighboring pixels of the current block and the reference block in the motion compensation method. Equations 3 and 4 used in the motion compensation method are as follows.

$b = m_C - m_R$, assume that $m_C \approx m_{C_n}$ and $m_R \approx m_{R_n}$ then $$\tilde{b} = m_{C_n} - m_{R_n}, \quad \tilde{b} \approx b \quad (3)$$

$$mMRSAD = \sum_{i=1}^{N} \sum_{j=1}^{N} |C(i, j) - (R(i, j) + \tilde{b})| \quad (4)$$

Here, $m_C$ and $m_R$ denote a mean value of the current block and a mean value of the reference block, respectively. Also, $m_{C_n}$ and $m_{R_n}$ denote a mean value of neighboring pixels of the current block and a mean value of neighboring pixels of the reference block, respectively. The approximate value of the mean value of each of the blocks, obtained as described above, is subtracted from pixel values of each of the blocks, so that a block having a high-frequency component most similar to that of the current block is detected from reference candidate blocks.

The combination of the neighboring pixels of the reference block and neighboring pixels of the current block for the purpose of the implementation, i.e. the combination of pixels used to evaluate $m_{C_n}$ and $m_{R_n}$, has been designed. (For reference, see P. Yin, A. M. Tourapis, and J. Boyce, "Localized weighted prediction for video coding," IEEE International Symposium on Circuits and Systems 2004, Vol. 5, pp. 4365-4368, May 2005).

However, in the related art method, characteristics of neighboring coded blocks are not used to measure the distortions of the high-frequency and low-frequency components, and hence, it is inefficient to enhance compression efficiency. Further, only the distortion of the high-frequency component is considered in the motion estimation, hence, there is a problem in enhancing only compression efficiency of specific images. (For reference, see D. S. Turaga and T. Chen, "Estimation and mode decision for spatially correlated motion sequences," IEEE Transactions on Circuits and Systems for Video Technology, Vol. 11, No. 10, pp. 1098-1107, October 2001; J.-H. Hur, S. Cho, Y.-L. Lee, "Adaptive Local Illumination Change Compensation Method for H.264/AVC-Based Multiview Video Coding," IEEE Transaction on Circuits and Systems for Video Technology, Vol. 17, No. 11, November 2007).

Furthermore, when the distortion estimation of the high-frequency component is performed in the motion estimation and a low-frequency estimation is performed after the motion estimation is finished, the distortion values of the low-frequency component caused in the low-frequency estimation are not considered. Hence, the compression efficiency is not significantly increased with respect to images with a small illumination change.

SUMMARY OF THE INVENTION

In one embodiment, there is provided a method for measuring distortion for motion estimation, in which the distortion measurement of a current block is performed by respectively calculating the sum of distortion values of a low-frequency component and the sum of distortion values of a low-frequency component, reduced through the predicted efficiency value of the low-frequency component estimation and then adding the two sums, so that the motion estimation can be performed without using the recursive algorithm for obtaining the sum of the distortion values of the low-frequency component, reduced through the predicted efficiency value of the low-frequency component estimation, i.e., the N-pass encoding structure.

In another embodiment, there is provided a method for measuring distortion in which the distortion measurement of a current block is performed using an algorithm for predicting the efficiency of low-frequency component estimation, so that a reference block having the smallest amplitude of a residual signal with the current block can be selected, and accordingly, the compression efficiency can be enhanced regardless of characteristics of images.

In one aspect, there is provided a method for measuring distortion of a current block, used to estimate motion by estimating high-frequency and low-frequency components of the current block, the method comprising: calculating the sum of distortion values of the high-frequency component of the current block using a value obtained by subtracting pixel values of reference blocks of the current block and a difference value between mean values of the current and reference blocks from pixel values of the current block; calculating the sum of first distortion values of the low-frequency component of the current block using the pixel values of the current block and the pixel values of the reference blocks of the current block; calculating a second distortion value of the low-frequency component of the current block by multiplying the sum of the distortion values of the low-frequency component of the current block by an efficiency value of the low-frequency component estimation of the current block; and adding the sum of the distortion values of the high-frequency component of the current block and the second distortion value of the low-frequency component of the current block.

The method for measuring distortion may further comprise calculating a distortion value based on the low-frequency motion estimation of a predicted result obtained using a difference value between the mean value of the current block and the mean value of reference blocks indicated by a predicted motion vector (PMV) of the current block, and a difference value between the mean value of neighboring pixels of the current block and the mean value of neighboring pixels of the reference blocks indicated by the PMV of the current block, between the calculating of the sum of the first distortion values of the low-frequency component and the calculating of the second distortion value of the low-frequency component.

In the calculating of the second distortion value of the low-frequency component, the efficiency value of the low-frequency component of the current block may be a value obtained by dividing the distortion value based on the low-frequency motion estimation by the difference value between the mean pixel value of the current block and the mean pixel value of a reference block indicated by the PMV of the current block.

The efficiency value of the low-frequency component estimation of the current block may be 0 to 1.

The current block may have a block size of a 16×16 macro-block or a sub-block smaller than the 16×16 macro-block.

In the calculating of the second distortion value of the low-frequency component, the pixels of the reference block of the current block and neighboring pixels of the reference block may be pixels of the reference block indicated by the PMV of the current block and neighboring pixels of the reference block, respectively.

These together with other aspects of the disclosure, along with the various features of novelty that characterize the disclosure, are pointed out with particularity in the claims annexed hereto and form a part of the disclosure. For a better understanding of the disclosure, its operating advantages, and the specific objects attained by its uses, reference should be made to the accompanying drawings and descriptive matter in which there are illustrated exemplary embodiments of the disclosure. Like reference numerals indicate like elements throughout the specification and drawings.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION OF EXEMPLARY EMBODIMENTS

Hereinafter, exemplary embodiments of the disclosure will be described with reference to the accompanying drawings. However, the disclosure is not limited to the embodiments but may be implemented into different forms. These embodiments are provided only for illustrative purposes and for full understanding of the scope of the disclosure by those skilled in the art.

Figure 1:
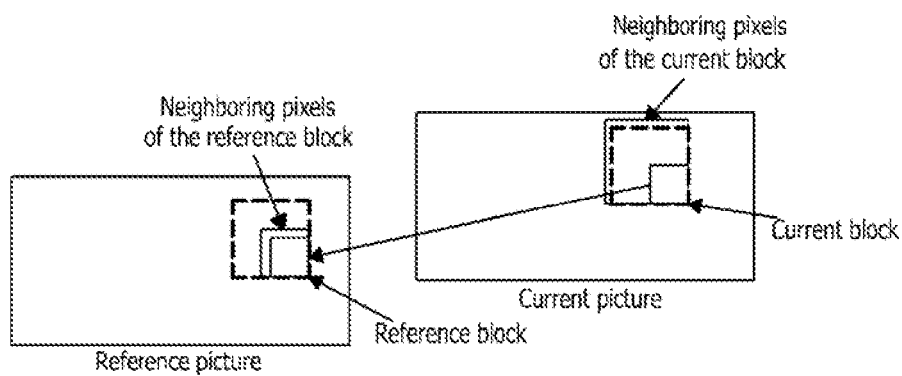
FIG. 1 is a view illustrating a method of selecting an adjacent pixel according to a related art.
Figure 2:
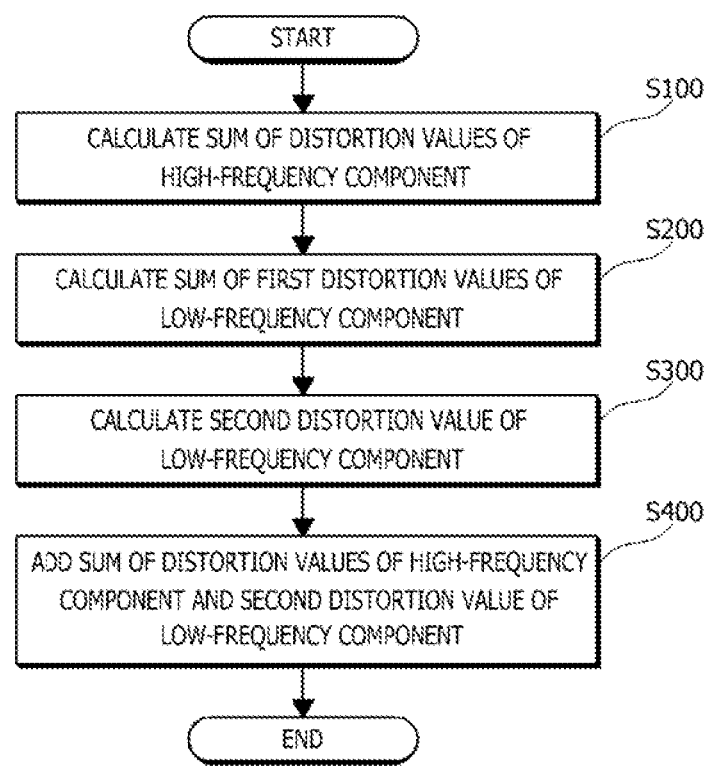
FIG. 2 is a flowchart illustrating a method for measuring distortion of a current block according to an embodiment.
Figure 3:
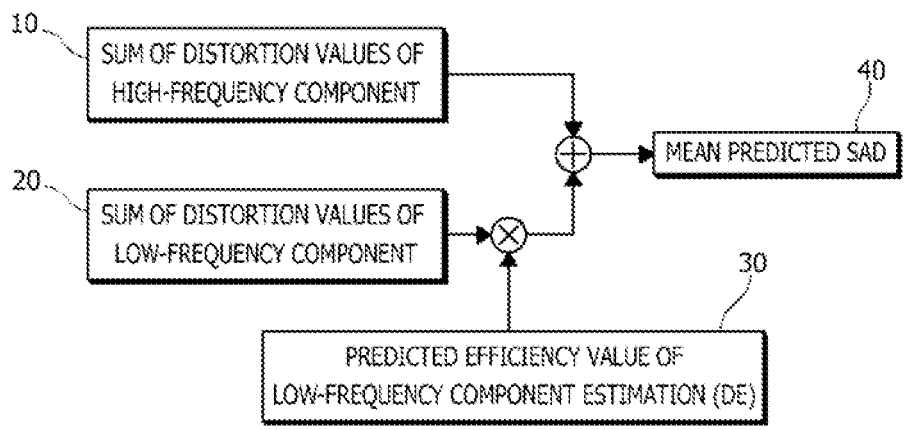
FIG. 3 is a block diagram illustrating the method for measuring distortion of the current block according to the embodiment.

FIG. 2 is a flowchart illustrating a method for measuring distortion of a current block according to an embodiment. FIG. 3 is a block diagram illustrating the method for measuring distortion of the current block according to the embodiment. Hereinafter, a 16×16 macro-block will be described as an example of the current block.

As illustrated in FIGS. 2 and 3, the method for measuring distortion of the current block according to this embodiment relates to a method for measuring distortion of a current block, used to perform motion estimation by estimating high-frequency and low-frequency components of the current block. The method for measuring distortion comprises calculating the sum 10 of distortion values of the high-frequency component (S100); calculating the sum 20 of first distortion values of the low-frequency component (S200); calculating a second distortion value of the low frequency component (S300); and adding the sum 10 of the distortion values of the high-frequency component and the second distortion value of the low frequency component (S400).

The method for measuring distortion further comprises calculating a distortion value 30 based on the low-frequency motion estimation of a predicted result obtained using a difference value between the mean value of the current block and the mean value of reference blocks indicated by a predicted motion vector (PMV) of the current block, and a difference value between the mean value of neighboring pixels of the current block and the mean value of neighboring pixels of the reference blocks indicated by the PMV of the current block, between the calculating of the sum 20 of the first distortion values of the low-frequency component and the calculating of the second distortion value of the low-frequency component. Here, the distortion value 30 based on the low-frequency motion estimation refers to a value obtained by dividing the distortion value based on the low-frequency motion estimation by the difference value between the mean value of pixels of the current block and the mean value of pixels of the reference blocks indicated by the PMV. At this time, the PMV is a motion vector predicted without passing through a motion estimation process, and may be calculated using a block size, a reference frame index, a motion estimation vector of a neighboring block, and the like. Meanwhile, if it is assumed that the current block has a block size of 16×16, the predicted efficiency value of low-frequency component estimation aligned in the process of motion estimation in all sub-blocks of the current block, i.e., 16×8, 8×16, 8×8, . . . and 4×4 blocks, through the current and the reference block indicated by the PMV of the current block may be calculated using the PMV obtained in each of the sub-blocks, or may be fixed as one value calculated in the 16×16 block. Accordingly, the efficiency value of low-frequency estimation, described in Equation 7, may be fixed in all the sub-blocks as the predicted efficiency value of low-frequency estimation, calculated using the PMV of the 16×16 block. Since the sub-blocks have different PMVs from one another, the predicted efficiency value of low-frequency estimation may be newly calculated for each of the sub-blocks and used in the process of motion estimation. If it is assumed that the current block has a block size of 16×16, the predicted efficiency value of low-frequency component estimation aligned in the process of motion estimation in all the sub-blocks of the current block, i.e., 16×8, 8×16, 8×8, . . . and 4×4 blocks, are fixed through the current and the reference block indicated by the PMV of the current block.

In the calculating of the sum 10 of the distortion values of the high-frequency component (S100), the sum 10 of the distortion values of the high-frequency component of the current block is calculated using the value obtained by the pixel values of the reference block of the current block and the difference value between the mean values of the current and reference blocks from the pixel values of the current block. At this time, the sum 10 of the distortion values of the high-frequency component may be calculated by the following Equation 5.

$$Dist_{AC} = \sum_{i=0}^{N-1}\sum_{j=0}^{M-1} |(C_{(p,q)}(i,j) - (R_{(p,q)}(i,j) + (m_{C_{(p,q)}} - m_{R_{(p,q)}})))| \quad (5)$$

$$\text{for } p = \left[0, \frac{16}{N} - 1\right], \quad q = \left[0, \frac{16}{M} - 1\right]$$

Here, N and M denote lateral and longitudinal lengths of each of the blocks, respectively, and p and q denote block indices in a macro-block.

In the calculating of the sum 20 of the first distortion values of the low-frequency component (S200), the sum 20 of the first distortion values of the low-frequency component of the current block is calculated by using the pixel values of the current block and the pixel values of the reference block of the current block. In FIG. 3, the first distortion values are shown as distortion values. At this time, the sum of the distortion values of the low-frequency component may be calculated by the following Equation 6.

$$Dist_{DC} = N \cdot M \cdot |m_{C_{(p,q)}} - M_{R_{(p,q)}}| \quad (6)$$

$$\text{for } p = \left[0, \frac{16}{N} - 1\right], \quad q = \left[0, \frac{16}{M} - 1\right]$$

Here, N and M denote lateral and longitudinal lengths of each of the blocks, respectively, and p and q denote block indices in a macro-block. Also, $m_C$ and $m_R$ denote mean pixel values of the current and reference blocks, respectively.

In the calculating of the predicted efficiency value of low-frequency component estimation, the predicted efficiency value 30 of low-frequency component estimation is calculated by predicting the efficiency value of the low-frequency component and multiplying Equation 6 by the predicted efficiency value. Accordingly, the distortion measurement can be performed without using the N-pass encoding structure. The calculating of the predicted efficiency value of low-frequency component estimation may be calculated by the following Equation 7.

$$\lambda_{DE} = \begin{cases} \frac{\Delta Dist_{DC_{16\times16}}}{Dist_{DC_{16\times16}}} & \text{if } \frac{\Delta Dist_{DC_{16\times16}}}{Dist_{DC_{16\times16}}} < 1 \\ 1, & \text{otherwise} \end{cases} \quad (7)$$

$$Dist_{DC_{16\times16}} = 16 \cdot 16 \cdot |m_C^{16\times16} - m_R^{16\times16}| \quad (8)$$

$$\Delta Dist_{DC_{16\times16}} = |(m_C^{16\times16} - m_R^{16\times16}) - (m_{C_n}^{16\times16} - m_{R_n}^{16\times16})| \quad (9)$$

Here, $m_C^{16\times16}$ and $m_R^{16\times16}$ denote mean pixel values of current and reference macro-blocks having a block-size of 16×16, respectively. Here, the method of selecting the reference macro-block is determined by the PMV provided by the reference macro-block. Also, $m_{C_n}^{16\times16}$ and $m^{16\times16}_{R_n}$ denote a mean value of neighboring pixels of the current macro-block and a mean value of neighboring pixels of the reference macro-block having the PMV, respectively. The magnification reflected in the sum of the distortion values of the low-frequency component is determined between 0 and 1 by Equation 7, and the sum of the distortion values of the low-frequency component is multiplied by the determined magnification. Thus, the motion estimation can be performed without using the feedback system, i.e., the N-pass encoding structure.

In calculating of the second distortion value of the low-frequency component (S300), the second distortion value of the low-frequency component of the current block is calculated by multiplying the sum of the distortion values of the low-frequency component of the current block by the predicted efficiency value of low-frequency component estimation of the current block.

In the adding of the sum of the distortion values of the high-frequency component and the second distortion value of the low-frequency component (S400), the sum of the distortion values of the high-frequency component of the current block and the second distortion value of the low-frequency component of the current block are added together. At this time, the addition of the sum of the distortion values of the high-frequency component of the current block and the second distortion value of the low-frequency component of the current block refers to a mean predicted SAD (MPSAD) 40. Finally, in the adding of the sum of the distortion values of the high-frequency component and the second distortion value of the low-frequency component, the MPSAD 40 may be calculated by the following Equation 10.

$$MPSAD_{(p,q)}^{N \times M} = \sum_{i=0}^{N-1} \sum_{j=0}^{M-1} \left| \left( C_{(p,q)}(i,j) - R_{(p,q)}(i,j) + \left( m_{C_{(p,q)}} - m_{R_{(p,q)}} \right) \right) \right| + N \cdot M \cdot \lambda_{DE_{16 \times 16}} \cdot \left| m_{C_{(p,q)}} - m_{R_{(p,q)}} \right|$$

$$\text{for } p = \left[ 0, \frac{16}{N} - 1 \right], \quad q = \left[ 0, \frac{16}{M} - 1 \right]$$

(10)

According to the method for measuring distortion of this embodiment, the distortion measurement for motion estimation is performed by respectively calculating the sum of the distortion values of the high-frequency component and the sum of the distortion values of the low-frequency component, reduced by the predicted efficiency value of low-frequency component estimation, and then adding the two sums. Therefore, it is unnecessary to use a recursive algorithm required to obtain the sum of the distortion values of the low-frequency component.

Figure 4:
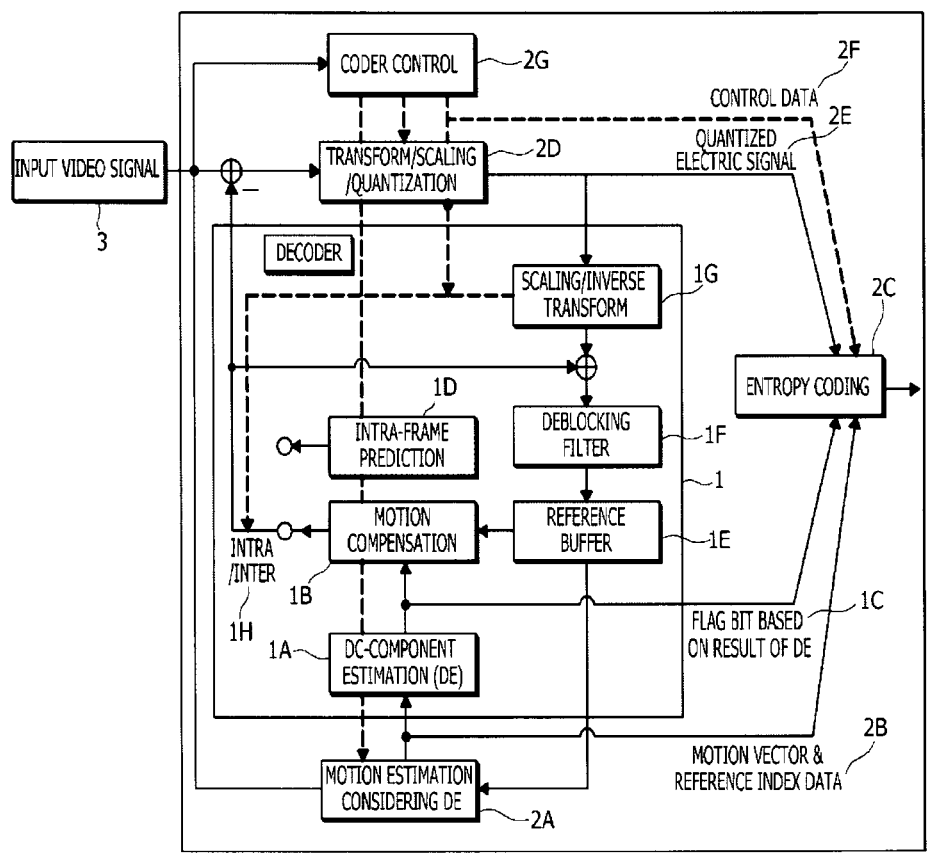
FIG. 4 is a block diagram illustrating the structure of a video encoder and a video decoder, to which the method for measuring distortion of the current block is applied according to the embodiment.

FIG. 4 is a block diagram illustrating the structure of a video encoder and a video decoder, to which the method for measuring distortion of the current block is applied according to the embodiment. Meanwhile, in the video encoder and decoder to which the method for measuring distortion of the current block is applied according to the embodiment, other components except the method for measuring distortion for motion estimation have the structure using the H.264/AVC video coding standard.

As illustrated in FIG. 4, the video encoder 2 having the method for measuring distortion applied thereto performs motion estimation through blocks of a reference frame in a reference buffer 1E so as to estimate a high-frequency component of an input video signal 3. Here, the distortion measurement for motion estimation 2A is performed by reflecting the efficiency of low-frequency estimation in a distortion value of a low-frequency component and adding a distortion value of the high-frequency component to the distortion value of the low-frequency component.

More specifically, in the process of motion estimation, the efficiency of the low-frequency component estimation performed in a process of motion compensation is defined between 0 and 1, and the distortion measurement is performed by adding the result obtained by multiplying the sum of distortion values of the low-frequency component by the efficiency and the sum of distortion values of the high-frequency component. Then, in the process of the motion compensation, the low-frequency component estimation 1A (hereinafter, referred to as DC-component estimation, i.e., DE) is performed by using the mean value of pixels of an estimated block and the mean value of neighboring pixels of the estimated block, and the mean value of pixels of a current block and the mean value of neighboring pixels of the current block. At this time, a flag bit 1C related to the use of the DE is added to a bit stream.

In order to determine the value of the flag bit 1C based on the result of the DE, the compensated value of the estimated low-frequency component is reflected in the determined reference block through the MPSAD 2A obtained in the process of motion estimation.

The reference that reflects the compensated value of the estimated low-frequency component, i.e., offset b, in the current block is determined by comparing the rate-distortion cost (R-D cost) obtained when the compensated value is reflected with the R-D cost obtained when the compensated value is not reflected. Here, the flag bit related to the use of the DE is added.

To this end, the R-D cost obtained when the offset b is reflected and the R-D cost obtained when the offset b is not reflected are compared with each other. When the R-D cost obtained when the offset b is reflected is smaller than that obtained when the offset b is not reflected, the estimated low-frequency component is applied to the determined reference block. When the R-D cost obtained when the offset b is reflected is greater than that obtained when the offset b is not reflected, the estimated low-frequency component is not applied to the determined reference block.

As described above, the result of the DE is adaptively used by comparing the R-D cost obtained when the offset b is reflected with the R-D cost obtained when the offset b is not reflected, thereby finally obtaining a residual signal of the current block.

Thus, the predicted block of the current block is obtained by 1A and 1B and generated in the process of motion compensation 1B based on the use of the DE. Finally, an encoded signal is generated by passing the residual signal through the process of transform/scaling/quantization (2D) and the process of entropy coding (2C).

Meanwhile, a coder control 2G transmits bidirectional estimation data and the like when estimating a quantization parameter or motion, and a control data 2F is a signal for transmitting the data applied to the coder control 2G. The deblocking filter IF is a filter for removing an artifact between blocks, and an intra-frame prediction 1D refers to a prediction method used in an intra-frame. The intra/inter 1H is used to select a prediction block generated in the intra or inter, and a motion vector & reference index data 2B is used to transmit a motion vector obtained in the motion estimation and the index of a reference frame.

The video decoder 1 having the method for measuring distortion applied thereto obtains a block having a compensated motion by using the reference block obtained by the motion vector & reference index data 2B, the flag bit 1C based on the result of the DE, and the like. The residual signal obtained through scaling/inverse transform 1G is finally added to the block. Here, the description of the method for performing the DE is repeated in those of FIGS. 2 and 3, and therefore, it will be omitted.

Thus, in the method for measuring distortion used in the motion estimation according to the embodiment, the method for reducing or not reducing the sum of distortion values of a low-frequency component, obtained by respectively calculating the sums of distortion values of low-frequency and high-frequency components and reflecting the efficiency of low-frequency component estimation, can be designed without using the feedback structure, i.e., the N-pass encoding structure.

As described above, in the method for measuring distortion for motion estimation according to an embodiment, the distortion measurement of a current block is performed by respectively calculating the sum of distortion values of a low-frequency component and the sum of distortion values of a low-frequency component, reduced through the predicted efficiency value of the low-frequency component estimation and then adding the two sums, so that the motion estimation can be performed without using the recursive algorithm for obtaining the sum of the distortion values of the low-frequency component, reduced through the predicted efficiency value of the low-frequency component estimation, i.e., the N-pass encoding structure.

Further, the distortion measurement of a current block is performed using an algorithm for predicting the efficiency of low-frequency component estimation, so that a reference block having the smallest amplitude of a residual signal with the current block can be selected, and accordingly, the compression efficiency can be enhanced regardless of characteristics of images.

While the exemplary embodiments have been shown and described, it will be understood by those skilled in the art that various changes in form and details may be made thereto without departing from the spirit and scope of this disclosure as defined by the appended claims. In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A method for measuring distortion of a current block of an input video signal, used to estimate motion by estimating high-frequency and low-frequency components of the current block, the method applied to a video encoder and a video decoder, the method comprising:
   calculating the sum of distortion values of the high-frequency component of the current block using a value obtained by subtracting pixel values of reference blocks of the current block and a difference value between mean values of the current and reference blocks from pixel values of the current block;
   calculating the sum of first distortion values of the low-frequency component of the current block using the pixel values of the current block and the pixel values of the reference blocks of the current block;
   calculating a second distortion value of the low-frequency component of the current block by multiplying the sum of the distortion values of the low-frequency component of the current block by an efficiency value of the low-frequency component estimation of the current block;
   adding the sum of the distortion values of the high-frequency component of the current block and the second distortion value of the low-frequency component of the current block;
   comparing a first rate-distortion cost obtained when a determined reference block is offset by a compensated value of the estimated low-frequency component with a second rate-distortion cost obtained when the determined reference block is not offset by the compensated value of the estimated low-frequency component;
   wherein when the first rate-distortion cost is less than the second rate-distortion cost, the compensated value of the estimated low-frequency component is added to the determined reference block, and when the first rate-distortion cost is greater than the second rate-distortion cost, the compensated value of the estimated low-frequency component is not added to the determined reference block; and
   generating a residual signal of the current block.

2. The method according to claim 1, further comprising calculating a distortion value based on the low-frequency motion estimation of a predicted result obtained using a difference value between the mean value of the current block and the mean value of reference blocks indicated by a predicted motion vector (PMV) of the current block, and a difference value between the mean value of neighboring pixels of the current block and the mean value of neighboring pixels of the reference blocks indicated by the PMV of the current block, between the calculating of the sum of the first distortion values of the low-frequency component and the calculating of the second distortion value of the low-frequency component.

3. The method according to claim 1, wherein, in the calculating of the second distortion value of the low-frequency component, the efficiency value of the low-frequency component of the current block is a value obtained by dividing, the distortion value based on the low-frequency motion estimation by the difference value between the mean pixel value of the current block and the mean pixel value of a reference block indicated by the PMV of the current block.

4. The method according to claim 2, wherein, in the calculating of the second distortion value of the low-frequency component, the efficiency value of the low-frequency component of the current block is a value obtained b dividing the distortion value based on the low-frequency motion estimation by the difference value between the mean pixel value of the current block and the mean pixel value of a reference block indicated by the PMV of the current block.

5. The method according to claim 3, wherein the efficiency value of the low-frequency component estimation of the current block is 0 to 1.

6. The method according to claim 4, wherein the efficiency value of the low-frequency component estimation of the current block is 0 to 1.

7. The method according to claim 1, wherein the current block has a block size of a 16×16 macro-block or a sub-block smaller than the 16×16 macro-block.

8. The method according to claim 1, wherein, in the calculating of the second distortion value of the low-frequency component, the pixels of the reference block of the current block and neighboring pixels of the reference block are pixels of the reference block indicated by the PMV of the current block and neighboring pixels of the reference block, respectively.

9. The method of claim 1, further comprising passing the residual signal through a process of transform/scaling/quantization and a process of entropy coding to generate an encoded signal.

10. The method of claim 1. further comprising adding a flag bit to a bit stream of a macro-block of the current block to indicate whether the offset b is added to the determined reference block.

11. The method of claim 10 wherein when the offset b is added to the determined reference block, the flag bit has a value of 1, and wherein when the offset b is not added to the determined reference block, the flag bit has a value of 0.

12. The method of claim 1 wherein the offset b is a compensated value of the estimated low-frequency component.

* * * * *